Isaac N. Young. Gate.

No. 72957

PATENTED
DEC 31 1867

Witnesses:
J. C. Kemon
C. A. Pettit

Inventor:
Isaac N. Young
By Munn & Co
Attorneys

United States Patent Office.

ISAAC N. YOUNG, OF SWAN, INDIANA.

Letters Patent No. 72,957, dated December 31, 1867.

---

IMPROVEMENT IN GATES.

---

The Schedule referred to in these Letters Patent and making part of the same.

---

TO ALL WHOM IT MAY CONCERN:

Be it known that I, ISAAC N. YOUNG, of Swan, in the county of Noble, and State of Indiana, have invented a new and improved Gate; and I do hereby declare the following to be a full, clear, and exact description of the same, reference being had to the accompanying drawings, forming part of this specification, and in which—

Similar letters of reference indicate corresponding parts in the several figures.

Figure 1:
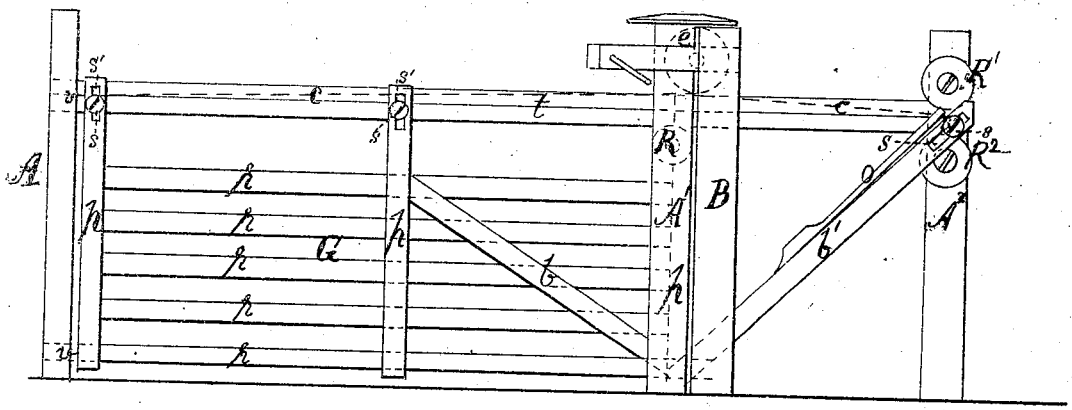
Figure 1 is a side elevation of my invention.

This invention is designed for a farm or road-gate, and is made to be opened or closed by persons in carriages, without the necessity of their getting out of the vehicle.

In the drawings, A represents the post, against which the gate shuts; A', a double post, which mainly supports the gate; A'', a post in the rear, which assists in supporting the gate; and B B', posts, standing by the side of the road, at a distance from and opposite to the central post A', for the purpose of supporting the crank by which the gate is opened and closed. The gate G is a common gate, constructed of rails $r\ r\ r$, a brace, $b$, and three posts $p\ p\ p$, which connect and support the rails. The gate thus made is attached to a long rebated top bar, $t$, by means of the posts $p\ p\ p$, which extend to some distance above the top of the gate G, and are fastened to the top bar $t$, by set-screws $s\ s$, passing through slots $s'$ in the posts $p$, and screwing into the top bar. By this means the height of the gate G from the ground may be adjusted at pleasure, to clear the ice, snow, &c., that may collect under it, and to counteract the settling of any of the posts. The gate is supported altogether by the top bar $t$, which slides back and forth between the double post A', on a roller, R, its rear end projecting to the post A'', and sliding between two rollers R' and R'', one above and one below it. A second brace, $b'$, extends from the rear end of the top bar $t$, down to the lower end of the rear post $p$, to strengthen the gate. It is provided with a slot, and attached to the top bar by a set-screw, in the same manner and for the same purpose as the posts $p\ p\ p$.

Figure 2:
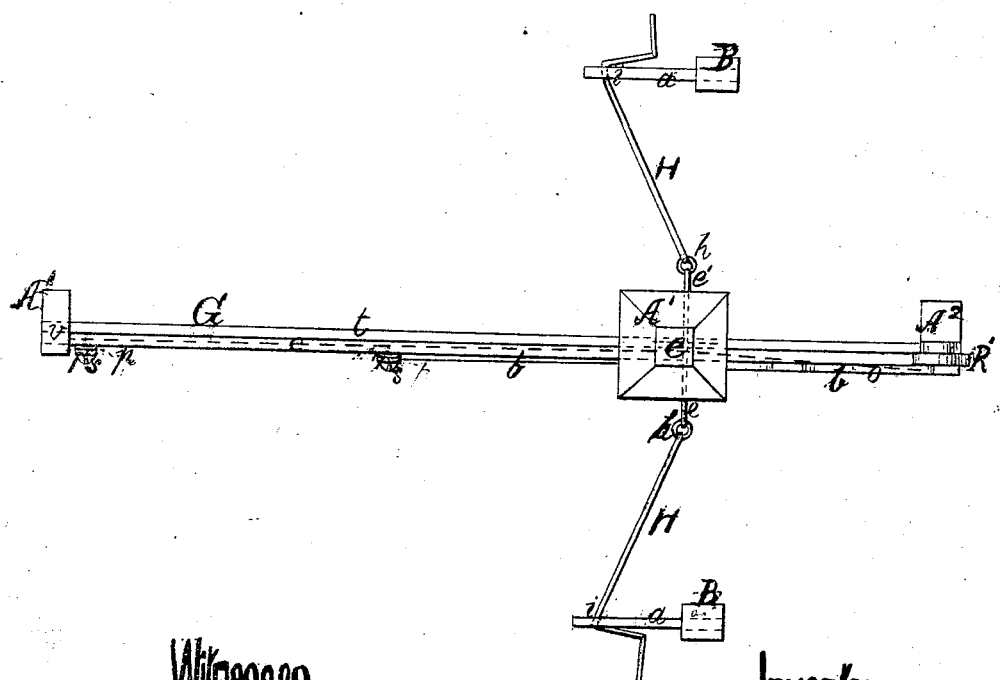
Figure 2 is a top view of the same.

The whole gate, thus constructed and supported, is slid backward and forward by a cord, $c$, passing over a pulley, $e$, the shaft of which is fixed to the pulley, and revolves with it. The ends of the shaft $e$ are bent into rings, and connected with a crank-rod, H, on each side of the gate, the ends of the crank-rod being bent into rings $h\ h$, and interlocked with the rings on the pulley-shaft, as shown in the drawings. The outer end of the crank-shaft bears at $i$, in sliding bars or arms $a\ a$, which can be pulled out of and pushed into the posts B B, so as to bring the crank closer to the carriage, or remove it further from it, as may be desired. The end of the top bar $t$ and the lower gate-rail $i$ are made with tenons $o\ o$, projecting towards the post A, which enter mortises in the post, and serve to support and hold the gate when it is closed. The forward end of the cord $c$ is attached in any convenient manner to the gate. The rear end of the cord is fastened to a spring or spring-bar, O, attached to the brace $b'$, as shown in the drawing. The upper rear roller R' is flanged, as shown in fig. 2, in order that its flange may pass over the side of the top bar and hold the latter in place, the top bar sliding behind the flange of the roller, as shown in fig. 1.

Having thus described my invention, what I claim as new, and desire to secure by Letters Patent, is—

1. In combination with a sliding gate, I claim the arrangement of the pulley-shaft $e'$ and crank-shaft H, the latter two connected together by the rings at their extremities, in the manner and for the purposes set forth.

2. I claim the sliding bars or arms $a\ a$, in combination with the crank-shaft H, when used in connection with a farm-gate, substantially as and for the purpose specified.

3. I claim the spring O, when used in connection with the cord $c$, upon a farm-gate, substantially as and for the purpose specified.

To the above specification of my improvement, I have signed my hand, this    day of    , 1867.

ISAAC N. YOUNG.

Witnesses:
 L. J. HOLMES,
 E. CRAMER.